I. GRIFFEN.
Potato-Digger.
No. 17,428.
Patented June 2, 1857.
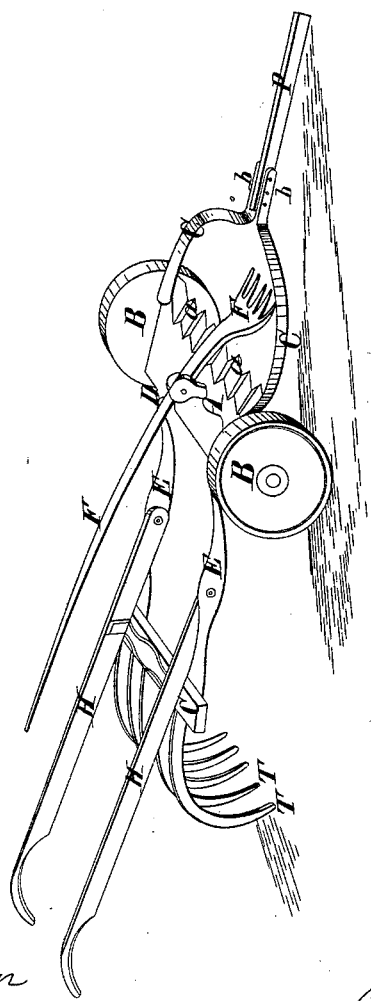
Witnesses:
Daniel Griffin
Israel Baker
Inventor:
Isaac Griffin

UNITED STATES PATENT OFFICE.

ISAAC GRIFFEN, OF QUAKER SPRINGS, NEW YORK.

IMPROVEMENT IN POTATO-DIGGERS.

Specification forming part of Letters Patent No. 17,428, dated June 2, 1857.

*To all whom it may concern:*

Be it known that I, ISAAC GRIFFEN, of Quaker Springs, Saratoga county, State of New York, have invented a new and useful Agricultural Implement for Digging Potatoes; and I declare the following specification, with the drawings hereto appended as part of the same, to be a full and perfect description thereof.

A is a broad axle-bar or platform, carried by low wheels B B at each end thereof, the front edge of which is formed into teeth $a\ a$, sharpened for cutting, similar to those for mowing-machines. The axle-bar may be made of wood, and in that case the teeth are formed on a separate metal bar and attached to the front of the wooden axle.

To the axle is attached a pair of short shafts, C C, with jaws $d\ d$ projecting forward and carrying between them a pole, P. These shafts are attached firmly to the axle, and the pole is fixed to the jaws $p\ p$ by a pin inserted into holes in the jaws at various distances, so as to regulate the droop of the cutters $a\ a$ at different angles and different distances from the surface of the soil, just as plow-clevises are regulated.

To the axle is also attached by a swivel-axis, so as to be easily lifted off and on, a broad fork, F, whose handle projects backward so as to be within the reach of the director or driver of the machine, and the tines drop down forward of the teeth $a\ a$.

To the rear of the bar, and attached by loops or hooks D D, are a pair of shafts, E E, projecting backward and carrying a cross-bar, G, to which are attached a number of drags or teeth, T T, curving at top to the rear and re-curving forward at bottom, sufficiently sharp on their lower front edges to drag out from the ground the potatoes without injuring them.

Attached to the shafts are a pair of handles, H H, arranged like plow-handles, by which to guide the movements of the instrument.

The operation of the machine is simple. As it progresses over the ground the teeth $a\ a$, aided by the operations of the fork F, which is swayed back and forth by the director or driver of the digger, cut off and remove weeds near the surface of the ground, so that the drags T T may without material obstruction bring the potatoes out of their hills.

What I claim, and desire to secure by Letters Patent, is—

The arrangement of drag G, axle A, and swinging fork F, substantially in the manner and for the purposes set forth.

ISAAC GRIFFEN.

Witnesses:
 ISRAEL BAKER,
 DANIEL GRIFFEN.